(12) United States Patent
Taguchi

(10) Patent No.: US 6,474,083 B2
(45) Date of Patent: Nov. 5, 2002

(54) VARIABLE DISPLACEMENT COMPRESSOR WITH CAPACITY CONTROL DEVICE

(75) Inventor: Yukihiko Taguchi, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/836,187

(22) Filed: Apr. 18, 2001

(65) Prior Publication Data

US 2001/0032471 A1 Oct. 25, 2001

(30) Foreign Application Priority Data

Apr. 21, 2000 (JP) ........................ 2000-126288

(51) Int. Cl.⁷ .................. F25B 49/02; F04B 27/14
(52) U.S. Cl. ................. 62/133; 62/158; 62/228.3; 62/228.5; 62/229; 62/180
(58) Field of Search ................. 62/133, 157, 158, 62/180, 182, 228.1, 228.3, 228.4, 228.5, 231, 229; 236/91 R, 91 C, 91 E, 91 F

(56) References Cited

U.S. PATENT DOCUMENTS

| 4,102,150 A | 7/1978 | Kountz |
| 4,326,386 A | 4/1982 | Tamura |
| 4,358,936 A | 11/1982 | Ito et al. |
| 4,480,443 A * | 11/1984 | Nishi et al. ............... 62/158 X |
| 4,485,634 A | 12/1984 | Yasuda et al. |
| 4,485,635 A | 12/1984 | Sakano |
| 4,539,821 A | 9/1985 | Tamura |
| 4,582,124 A | 4/1986 | Yoshimi et al. |
| 4,633,675 A | 1/1987 | Sato |
| 4,753,083 A | 6/1988 | Sato |
| 4,796,438 A | 1/1989 | Sato |
| 4,862,700 A * | 9/1989 | Suzuki ..................... 62/133 X |
| 5,172,563 A * | 12/1992 | Fujii ..................... 62/228.5 X |
| 5,992,156 A | 11/1999 | Isobe et al. |
| 6,321,550 B1 * | 11/2001 | Chopko et al. ........ 62/228.5 X |

* cited by examiner

Primary Examiner—Harry B. Tanner
(74) Attorney, Agent, or Firm—Baker Botts L.L.P.

(57) ABSTRACT

A capacity control device controls a discharge capacity of a variable displacement compressor for use in an automotive air conditioning system. The air conditioning system has the compressor and an evaporator fan. The device includes a control, a first detector, and a second detector. The control changes the discharge capacity of the compressor between a minimum discharge capacity for that compressor and a maximum discharge capacity. The first detector detects an elapsed time of a minimum discharge capacity operation of the compressor. The second detector detects an impressed voltage of the evaporator fan of the air conditioning system. The discharge capacity increases from the minimum discharge capacity to a predetermined discharge capacity when the elapsed time of the minimum discharge capacity operation is greater than a predetermined time and when the impressed voltage of the evaporator fan is greater than a predetermined voltage.

34 Claims, 6 Drawing Sheets

VARIABLE DISPLACEMENT COMPRESSOR WITH CAPACITY CONTROL DEVICE

BACKGROUND OF THE INVENTION

1. Field of the Invention

The present invention relates to a displacement control device for a variable displacement compressor in an automotive air conditioning system, and more particularly, to a device which controls the discharge capacity of such variable displacement compressors in accordance with such air conditioning systems.

2. Description of Related Art

Variable displacement compressors having capacity control devices are known in the art. For example, Japanese First Patent Publication (Unexamined) No. 7-346845, which is incorporated herein by reference, describes a variable displacement compressor having a displacement control device in an automotive air conditioning system. In such automotive air conditioning systems, the compressor is driven by an engine of a vehicle without a clutch, e.g., an electromagnetic clutch.

This clutchless variable displacement compressor has a capacity control device, a discharge chamber, a crank chamber, a swash plate, a drive shaft, and a communication passage, which communicates between the crank chamber and the discharge chamber. The swash plate is provided on the drive shaft within the crank chamber. The capacity control device has a valve member, which is operated by an electromagnetic solenoid and opens or closes the communication passage for controlling refrigerant gas flowing from the discharge chamber to the crank chamber. Therefore, pressure within the crank chamber may be controlled, and a tilt angle between the swash plate and the drive shaft also may be controlled. As a result, the capacity control device of this compressor may control the discharge capacity of the variable displacement compressor.

When the automotive air conditioning system is switched off, this compressor may be operated in a minimum discharge capacity by the capacity control device. Even when the automotive air conditioning system is switched on, this compressor may be properly operated at a minimum discharge capacity by the capacity control device to maintain a predetermined temperature of a compartment of a vehicle.

In the capacity control device of such compressors, if the automotive air conditioning system is switched off for a long time, e.g., a few months, this compressor may be operated at the minimum discharge capacity by the capacity control device for a long time. e.g., a few months. In this operation, the tilt angle between the swash plate and the drive shaft becomes a maximum value, and stirring lubricant oil by the swash plate may be reduced. Therefore, circulation of refrigerant gas in a refrigerant circuit may be reduced, and the lubricant oil, which is discharged to the refrigerant circuit, may not return to this compressor. As a result, stirring the lubricant oil by the swash plate may be gradually reduced, and this compressor may become scored or cracked.

Moreover, in a capacity control device of a known variable displacement compressor of an automotive air conditioning system, the known variable displacement compressor alternatively may be driven by an engine of a vehicle via a clutch, e.g., an electromagnetic clutch. If such a compressor is continually operated in a minimum discharge capacity operation under the control of the capacity control device, problems similar to those encountered in the known clutchless, variable displacement compressor may occur.

SUMMARY OF THE INVENTION

A need has arisen to reduce or eliminate the above-mentioned defects or damages, which may be encountered in known variable displacement compressors with capacity control devices.

In an embodiment of this invention, there is provided a device for controlling a discharge capacity of a variable displacement compressor for use in an automotive air conditioning system of a vehicle. The air conditioning system comprises the compressor and an evaporator fan. The device comprises a control, a first detector, and a second detector. The control means adjust the discharge capacity of the compressor between a minimum discharge capacity and a maximum discharge capacity. The first detector means detect an elapsed time of minimum discharge capacity operation of the compressor. The second detector means detect an impressed voltage of the evaporator fan of the air conditioning system. The discharge capacity increases from the minimum discharge capacity to a predetermined discharge capacity when the elapsed time of the minimum discharge capacity operation is greater than a predetermined time and when the impressed voltage of the evaporator fan is greater than a predetermined voltage.

In another embodiment of this invention, there is provided a method for controlling a discharge capacity of a variable displacement compressor for use in an automotive our conditioning system of a vehicle. The air conditioning system has the compressor and an evaporator fan. The method comprises the steps of decreasing the discharge capacity of the compressor from a maximum discharge capacity to a minimum discharge capacity, detecting an elapsed time of a minimum discharge capacity operation of the compressor, detecting an impressed voltage of the evaporator fan of the air conditioning system, and adjusting the discharge capacity from the minimum discharge capacity in response to a comparison between the detected values and predetermined values corresponding to the detected values.

Objects, features, and advantages of embodiments of this invention will be apparent to persons of ordinary skill in the art from the following detailed description of the invention and the accompanying drawings.

BRIEF DESCRIPTION OF THE DRAWINGS

The present invention may be more readily understood with reference to the following drawings.

DETAILED DESCRIPTION OF PREFERRED EMBODIMENTS

Figure 1:
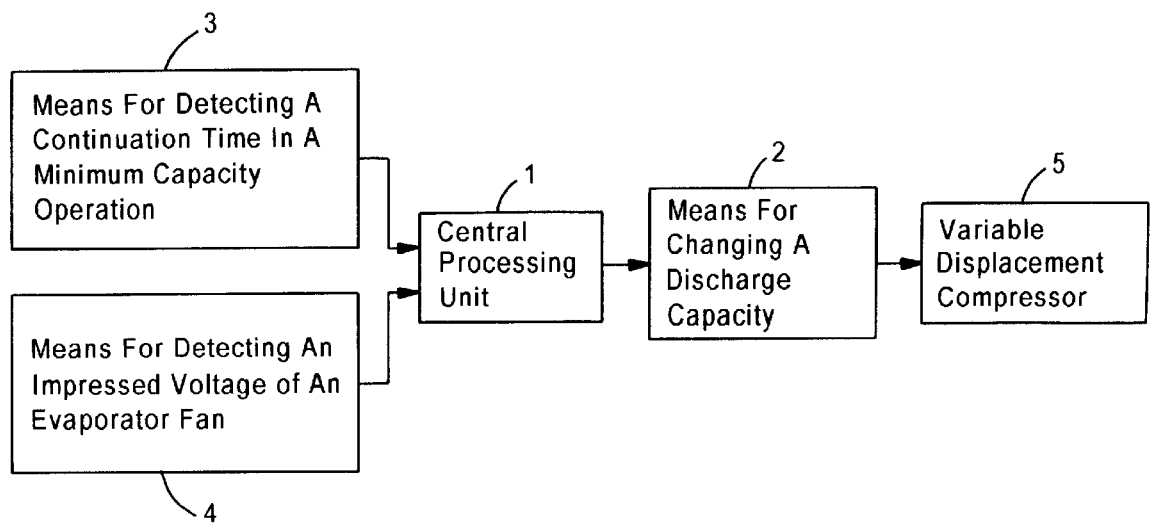
FIG. 1 is a block diagram depicting the elements of a capacity control device of a clutchless variable displacement compressor, according to a first embodiment of the present invention.
Figure 2:
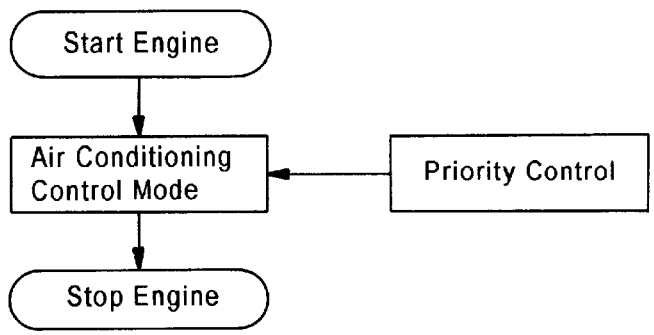
FIG. 2 is a flow diagram of a process for operation of the clutchless variable displacement compressor, according to the first embodiment of the present invention.
Figure 3:
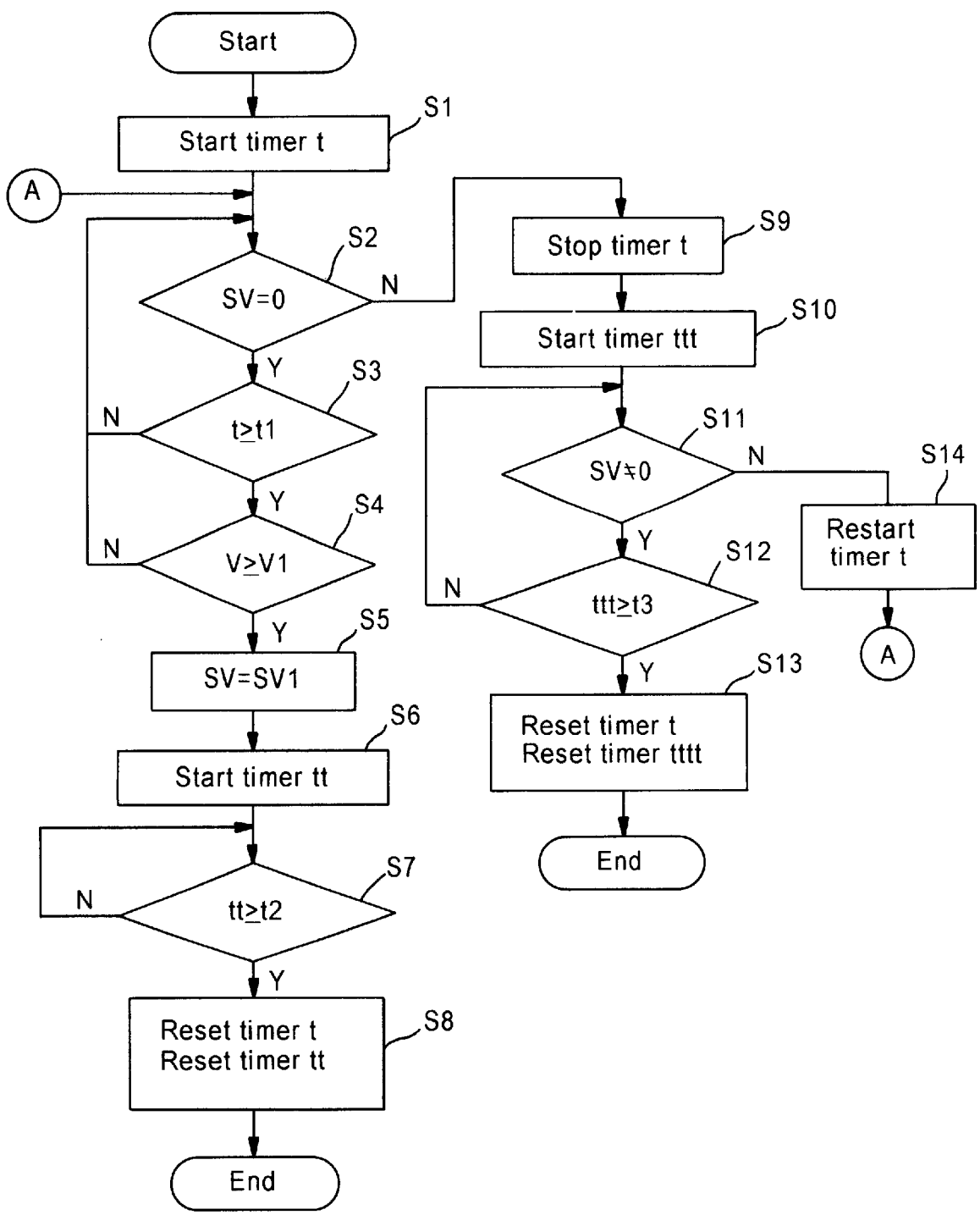
FIG. 3 is a flow diagram of a priority control of the process for operation of the clutchless variable displacement compressor, according to the first embodiment of the present invention.

Referring to FIGS. 1–3, a first embodiment of the present invention of a capacity control device of a variable displacement compressor 5 without a clutch, e.g., an electromagnetic clutch, is shown. As shown in FIG. 1, the capacity control device of this embodiment comprises a central processing unit 1, a means for changing a discharge capacity 2, a means for detecting an elapsed time in a minimum capacity operation 3, and a means for detecting an impressed voltage of an evaporator fan 4. Means for changing the discharge capacity 2 changes a discharge capacity of variable displacement compressor 5. Means for detecting the elapsed time in the minimum capacity operation 3 detects an elapsed time in a minimum discharge capacity operation of variable displacement compressor 5. Means for detecting the impressed voltage of the evaporator fan 4 detects an impressed voltage of an evaporator fan in an automotive air conditioning system. An output signal of means for detecting the elapsed time in the minimum capacity operation 3 and an output signal of means for detecting the impressed voltage of the evaporator fan 4 are input to central processing unit 1. A control signal is output from central processing unit 1 to means for changing discharge capacity 2. The capacity control device is attached to variable displacement compressor 5 for use in the automotive air conditioning system.

Means for changing discharge capacity 2 comprises a valve member, which is operated by an electromagnetic solenoid and opens or closes a communication passage communicating between the crank chamber and the discharge chamber for controlling refrigerant gas flowing from the discharge chamber to the crank chamber, same as the known clutchless variable displacement compressor. Therefore, pressure within the crank chamber may be controlled, and a tilt angle between a swash plate and a drive shaft also is controlled. As a result, means for changing the discharge capacity 2 controls the discharge capacity of variable displacement compressor 5.

Referring to FIGS. 2 and 3, flow diagrams of a process for operation of the first embodiment are shown. As shown in FIG. 2, control of variable displacement compressor 5 for use in the automotive air conditioning system by the capacity control device is started when an engine of a vehicle is started. The capacity control device performs an air conditioning control mode is accordance with a control program, which is given in advance. In the capacity control device, when the automotive air conditioning system is switched off, the discharge capacity of variable displacement compressor 5 is operated at a minimum discharge capacity (for that compressor). When the automotive air conditioning system is switched on, the discharge capacity of variable displacement compressor 5 is variably controlled between a minimum discharge capacity and a maximum discharge capacity, so that the temperature of a compartment of a vehicle maintains the predetermined temperature, which is set by a user of the vehicle.

The discharge capacity is variably controlled by a flow of electricity SV, which closes an electromagnetic solenoid. The electromagnetic solenoid changes the discharge capacity. e.g., SV equals 0 (zero), the discharge capacity of the variable displacement compressor is operated at the minimum discharge capacity. The electromagnetic solenoid is demagnetized and the communication passage between the discharge chamber and the crank chamber is opened to a maximum because the valve member is withdrawn from the communication passage. The pressure in the crank chamber increases because refrigerant gas is introduced from the discharge chamber to the crank chamber. As a result, the tilt angle between the swash plate and the drive shaft is increased until a maximum angle is achieved, and the discharge capacity of variable displacement compressor 5 is decreased to the minimum discharge capacity. If SV is increased, the discharge capacity of the variable displacement compressor may be increased. Thereafter, if the electromagnetic solenoid is magnetized, an opening of the communication passage decreases as the valve member reenters the communication passage. The pressure in the crank chamber is decreased because the flow of refrigerant gas, which is introduced from the discharge chamber into the crank chamber, is decreased. As a result, the tilt angle between the swash plate and the drive shaft may be decreased, and the discharge capacity of the variable displacement compressor may be increased.

The capacity control device performs a priority control at any time during the air conditioning control mode. Referring to FIG. 3, if the user or an external air conditioning control mechanism (not shown) sets the air conditioning system, such that SV equals 0 (zero) during the air conditioning control mode, the capacity control device starts the priority control in parallel with the air conditioning control mode. The capacity control device starts timer t and calculates an elapsed time at which SV equals 0 (zero) (S1). If the elapsed time that SV equals 0 (zero) is greater than a predetermined time t1, and if an impressed voltage V of the evaporator fan deserted by a voltage sensor (not shown) is greater than a predetermined value V1. SV increases from 0 (zero) to SV1, and the discharge capacity of variable displacement compressor 5 increases from the minimum discharge capacity to a predetermined discharge capacity (S2–S5). Consequently, refrigerant gas begins circulating in a refrigerant circuit, and the lubricant oil discharged into the refrigerant circuit returns to the crank chamber of variable displacement compressor 5. As a result, the tilt angle between the swash plate and the drive shaft may be decreased to below a maximum tilt angle, and stirring the lubricant oil in the crank chamber may be increased beyond a minimum value. Therefore, the lubricant oil in the crank chamber may be stirred at least a minimum required degree by the swash plate.

The capacity control device starts timer tt and calculates an elapsed time during which SV equals SV1. If the capacity control device detects a predetermined elapsed time t2 during which SV equals SV1, the capacity control device determines that sealing members for the drive shaft, sliding members, and coupling members of variable displacement compressor 5 are lubricated to at least a minimum required degree. Then, the capacity, control device resets timer t and timer tt, and terminates the priority control. After the termination of the priority control, the capacity control device maintains only the air conditioning control mode.

On the one hand, in the air conditioning control mode, if the user or the external air conditioning control mechanism (not shown) sets the air conditioning system, such that SV does not equal 0 (zero) before the elapsed time at which SV equals 0 (zero) does not become the predetermined time t1, the capacity control device temporarily stops timer t and starts timer tt. Then, the capacity control device calculates an elapsed time during which SV does not equal 0 (zero). If the elapsed time during which SV does not equal 0 (zero)

exceeds a predetermined time t3, the capacity control device determines that sealing members for the drive shaft, sliding members, and coupling members of variable displacement compressor 5 also are lubricated to at least a minimum required degree. Because the lubricant oil discharged into the refrigerant circuit returns to the crank chamber of variable displacement compressor 5, the tilt angle between the swash plate and the drive shaft may be decreased to below a maximum tilt angle. Moreover, the function of stirring the lubricant oil in the crank chamber may be increased beyond a minimum value. Then, the displacement control device resets timer t and timer ttt, and terminates the priority control (S2, S9–S13). After the termination of the priority control, the displacement control device maintains only the air conditioning control mode.

On the other hand, in the air conditioning control mode, if the user or the external air conditioning control mechanism sets the air conditioning system, such that SV equals 0 (zero) before the elapsed time at which SV does not equal 0 (zero) does not become a predetermined time t3, the capacity control device determines that sealing members for the drive shaft, sliding members, and coupling members of variable displacement compressor 5 are not lubricated to a required degree. The capacity control device restarts timer t and calculates the total time of the elapsed time during which SV equals 0 (zero). In this situation, if the total time of the elapsed time that SV equals 0 (zero) is greater than the predetermined time t1, and if the impressed voltage V of the evaporator fan is greater than the predetermined voltage V1, the capacity control device sets SV equal to SV1 for a predetermined time t2, and the restarted sealing members for the drive shaft, sliding members, and coupling members of variable displacement compressor 5 also are lubricated to at least a minimum required degree (S11 S14, S2–S7). Thereafter, the capacity control device resets timer t and timer tt, and terminates the priority control. After the termination of the priority control, the displacement control device maintains only the air conditioning control mode.

In the capacity control device of the clutchless variable displacement compressor 5, according to this embodiment, if the elapsed time of the minimum discharge capacity operation is greater than the predetermined time t1, the discharge capacity may be increased from the minimum discharge capacity to the predetermined discharge capacity. The lubricant oil discharged into the refrigerant circuit returns to the crank chamber of variable displacement compressor 5, and the tilt angle between the swash plate and the drive shaft may be decreased to below the maximum tilt angle. Therefore, the lubricant oil in the crank chamber may be stirred to at least a minimum required degree by the swash plate; and sealing members for the drive shaft, sliding member, and coupling members of variable displacement compressor 5 also may be lubricated to at least a minimum required degree. As a result, scoring of the variable displacement compressor may be effectively decreased or eliminated. If the impressed voltage of the evaporator fan is greater than the predetermined voltage, in other words, only if the evaporator fan is operated, the discharge capacity of variable displacement compressor 5 may be increased from the minimum discharge capacity to the predetermined discharge capacity, and the possibility of damage to variable displacement compressor 5 by a back flow of liquefied refrigerant gas may be eliminated.

When variable displacement compressor 5 is operated above the minimum discharge capacity, the lubricant oil discharged into the refrigerant circuit returns to the crank chamber of variable displacement compressor 5, and the tilt angle between the swash plate and the drive shaft may be deceased to below the maximum tilt angle. Therefore, the lubricant oil in the crank chamber may be stirred to at least a minimum required degree by the swash plate, and sealing members for the drive shaft, sliding members, and coupling members of the variable displacement compressor also may be lubricated to at least a minimum required degree. However, if the elapsed time of the operation that is at levels above the minimum discharge capacity is at below the predetermined time, the time of the lubrication may be insufficient, and the lubrication to the parts in variable displacement compressor 5 may be insufficient. In this embodiment, the elapsed time of the operation above minimum discharge capacity is not counted. When the total time of the elapsed time of minimum discharge capacity operation reaches the predetermined time, the discharge capacity of variable displacement compressor 5 may be increased from the minimum discharge capacity to the predetermined discharge capacity, and the parts in variable displacement compressor 5 may be lubricated to at least a minimum required degree.

Figure 4:
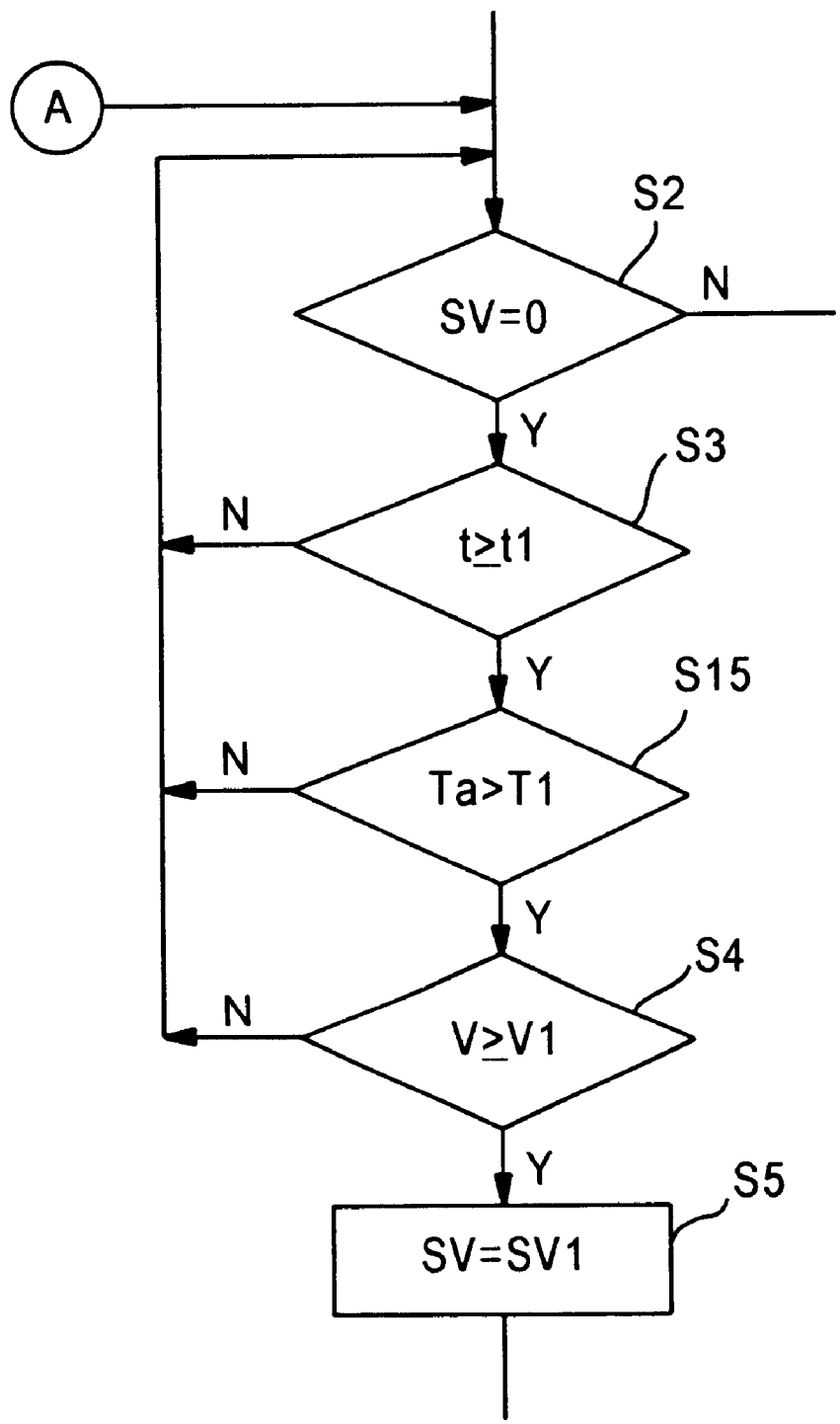
FIG. 4 is a flow diagram of a priority control of the process for operation of a clutchless variable displacement compressor, according to a second embodiment of the present invention.

Referring to FIG. 4, a second embodiment of the present invention of a capacity control device of a clutchless, variable displacement compressor is shown. In this embodiment, the capacity control device has a temperature sensor (not shown), which senses a temperature outside of the compartment of a vehicle, in addition to a voltage sensor, which senses an impressed voltage of an evaporator fan. In the priority control, if the elapsed time during which SV equals 0 (zero) exceeds the predetermined time t1, and if the outside temperature Ta which is sensed by the sensor exceeds the predetermined temperature T1, and if impressed voltage V which is sensed by the voltage sensor exceeds the predetermined voltage V1, SV is increased from 0 (zero) to the predetermined value SV1 (S2, S3, S15, S4, S5). The discharge capacity of the variable displacement compressor also may be increased from a minimum discharge capacity (for that compressor) to a predetermined discharge capacity, and refrigerant gas may begin circulating in a refrigerant circuit. The lubricant oil discharged into the refrigerant circuit may return to a crank chamber of the variable displacement compressor. Therefore, the lubricant oil in the crank chamber may be stirred to at least a minimum required degree by a swash plate; and sealing members for the drive shaft, sliding members, and coupling members of the variable displacement compressor also may be lubricated to at least a minimum required degree. The remaining structure and operation of the capacity control device of this embodiment are substantially the same as the capacity control device of the first embodiment of the present invention.

If the discharge capacity of the variable displacement compressor is increased from the minimum discharge capacity when the outside temperature is lower than the refrigerant freezing point, an evaporator may become frosted, and the evaporator may not work. As a result, damage to the variable displacement compressor by a back flaw of liquefied refrigerant gas may occur. Therefore, even if the elapsed time of the minimum discharge capacity operation exceeds the predetermined time, and even if the impressed voltage of the evaporator fan exceeds the predetermined voltage, if the outside temperature is lower than the P e.g., temperature, it is preferable to maintain the minimum capacity operation of the variable displacement compressor.

Figure 5:
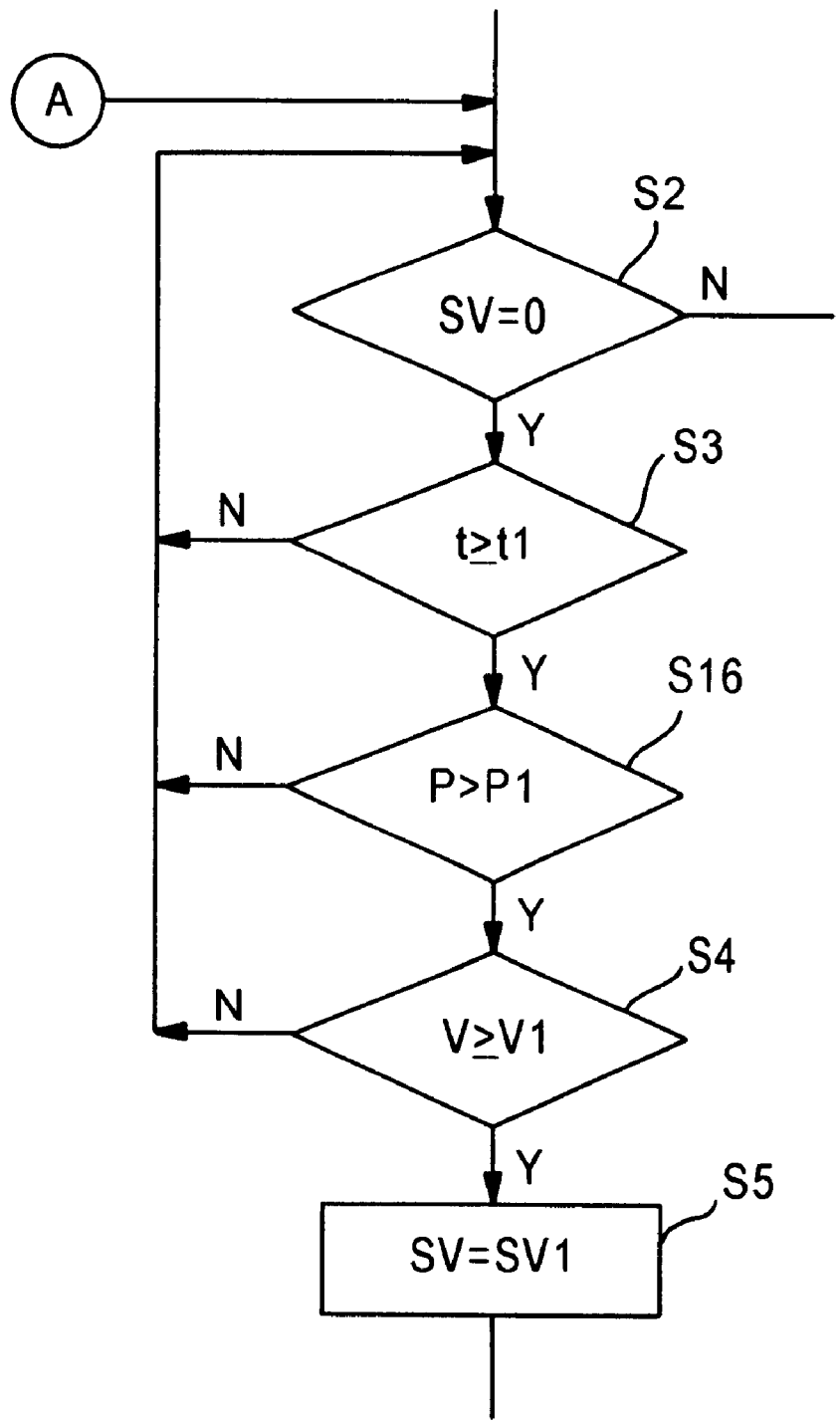
FIG. 5 is a flow diagram of a priority control of a process for operation of a clutchless variable displacement compressor, according to a third embodiment of the present invention.

Referring to FIG. 5, a third embodiment of the present invention of a capacity control device of a clutchless, variable displacement compressor is shown. In this embodiment, a capacity control device has a pressure sensor (not shown), in addition to a voltage sensor, which senses a refrigerant pressure. In the priority control, if the elapsed time during which SV equals 0 (zero) exceeds the predetermined time t1, and if a refrigerant pressure P, which is sensed by the pressure sensor, exceeds a predetermined value P1, and if impressed voltage V, which is sensed by the voltage sensor, becomes more than the predetermined voltage V1; SV is increased from 0 (zero) to predetermined value SV1 (S2, S3, S16, S4, S5). The discharge capacity of the variable displacement compressor also may be increased from a minimum discharge capacity (for that compressor) to a predetermined discharge capacity, and refrigerant gas may begin circulating is a refrigerant circuit. The lubricant oil discharged into the refrigerant circuit may return to a crank chamber of the variable displacement compressor. Therefore, the lubricant oil in the crank chamber may be stirred to at least a minimum required degree by a swash plate; and sealing members for the drive shaft, sliding members, and coupling members of the variable displacement compressor also may be lubricated to at least a minimum required degree. The remaining structure and operation of the capacity control device of this embodiment are substantially the same as the capacity control device of the first embodiment of the present invention. e.g., the discharge capacity of the variable displacement compressor is at or about the minimum discharge capacity, a discharge pressure of the variable displacement compressor may approach zero, and the refrigerant pressure may change mainly with respect to the outside temperature. Therefore, it is desirable that the discharge capacity is controlled by sensing the refrigerant pressure instead of the outside temperature. As a result, frosting of the evaporator may be reduced or eliminated.

Figure 6:
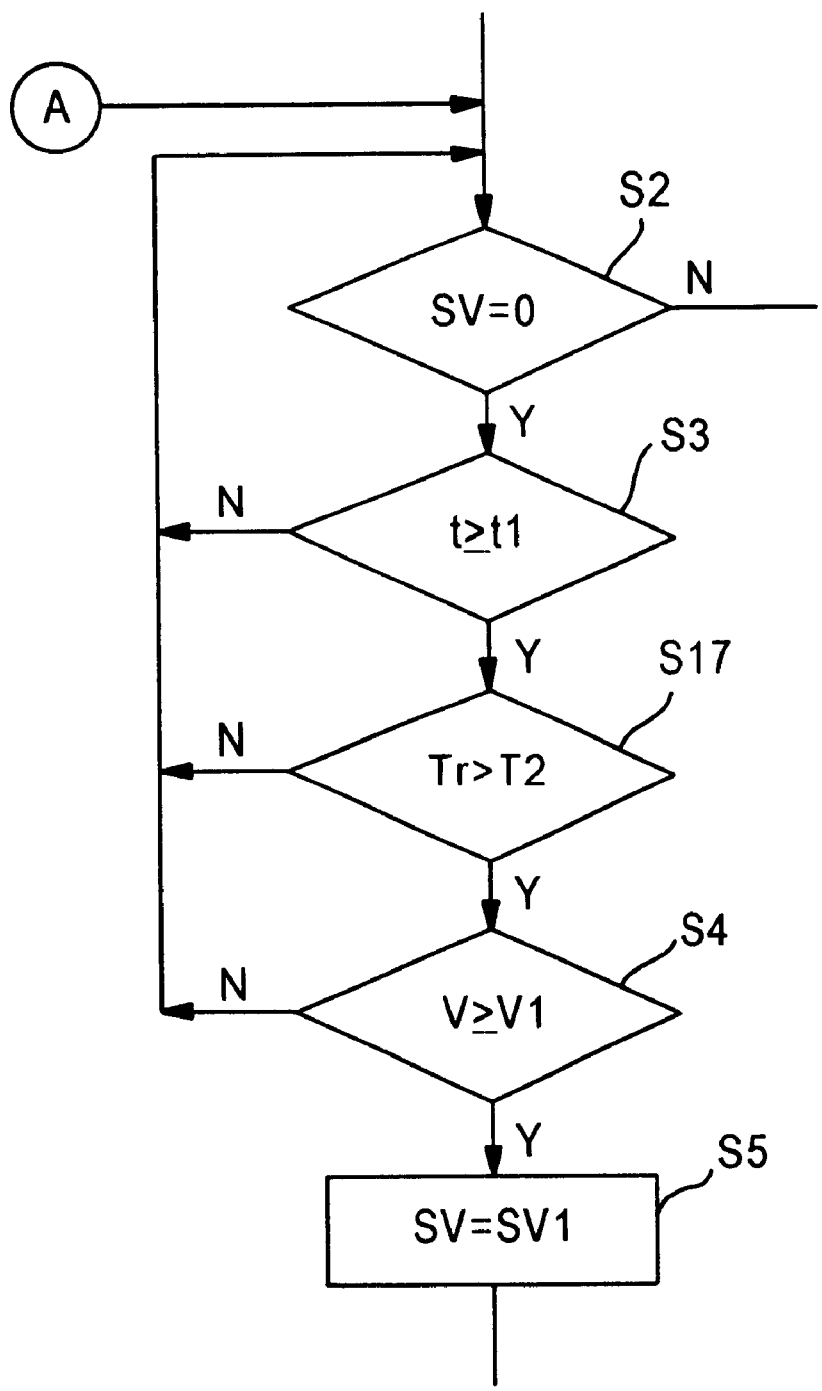
FIG. 6 is a flow diagram of a priority control of a process for operation of a clutchless variable displacement compressor, according to a fourth embodiment of the present invention.

Referring to FIG. 6, a fourth embodiment of the present invention of a capacity control device of a clutchless, variable displacement compressor is shown. In this embodiment, a displacement control device has a refrigerant temperature sensor (not shown), in addition to a voltage sensor, which senses a refrigerant temperature. In the priority control, if the elapsed time during which SV equals 0 (zero) exceeds the predetermined time t1, and if a refrigerant temperature Tr, which is sensed by the refrigerant temperature sensor, exceeds a predetermined temperature T2, and if impressed voltage V, which is sensed by the voltage sensor, exceeds the predetermined voltage V1; SV is increased from 0 (zero) to predetermined value SV1 (S2, S3, S17, S4, S5). The discharge capacity of the variable displacement compressor may be increased from a minimum discharge capacity (for that compressor) to a predetermined discharge capacity, and refrigerant gas may begin circulating in a refrigerant circuit. The lubricant oil discharged into the refrigerant circuit may return to a crank chamber of the variable displacement compressor. Therefore, the lubricant oil in the crank chamber may be stirred to at least a minimum required degree by a swash plate; and sealing members for the drive shaft, sliding members, and coupling members of the variable displacement compressor also may be lubricated to at least a minimum required degree. The remaining structure and operation of the capacity control device of this embodiment are substantially the same as the capacity control device of the first embodiment of the present invention. If the discharge capacity of the variable displacement compressor is at or about the minimum discharge capacity, an increase of the refrigerant temperature during the pressurization to refrigerant gas and a decrease of refrigerant temperature during the evaporated operation may approach zero, and the refrigerant temperature may change mainly with respect to the outside temperature. Therefore, it is desirable that the discharge capacity is controlled by sensing the refrigerant temperature instead of the outside temperature. As a result, frosting of the evaporator may be reduced or eliminated.

Figure 7:
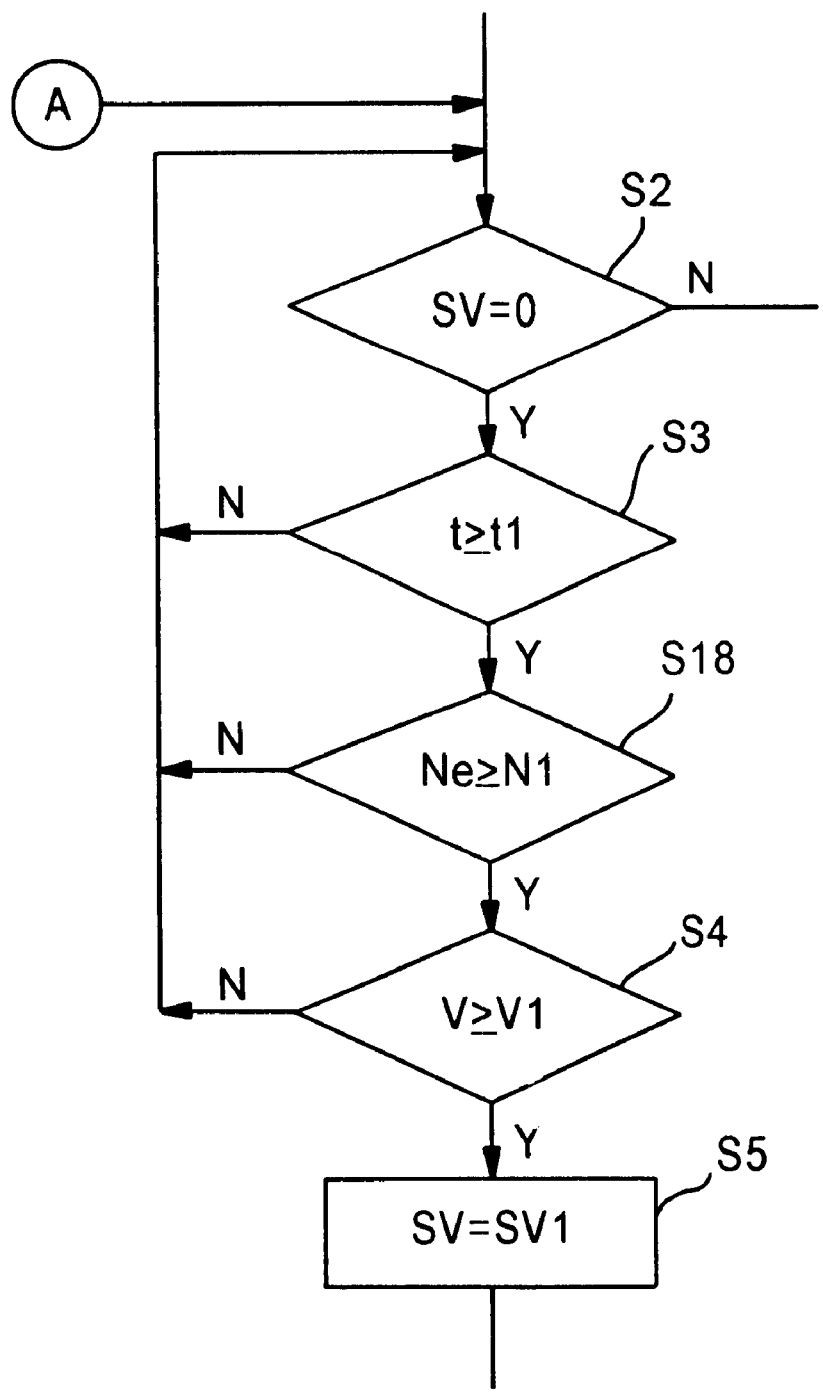
FIG. 7 is a flow diagram of a priority control of a process for operation of the clutchless variable displacement compressor, according to a fifth embodiment of the present invention.

Referring to FIG. 7, a fifth embodiment of the present invention of a capacity control device of a clutchless, variable displacement compressor is shown. In this embodiment, a displacement control device has a rev count sensor, such as a tachometer (not shown), in addition to a voltage sensor, which senses an engine rev count. In the priority control, if the elapsed time during which SV equals 0 (zero) exceeds the predetermined time t1, and if a rev count Ne, which is sensed by the rev count sensor, falls below a predetermined value N1, and if impressed voltage V, which is sensed by the voltage sensor, exceeds the predetermined voltage V1. SV is increased from 0 (zero) to the predetermined value SV1 (S2, S3, S18, S4, S5). The discharge capacity of the variable displacement compressor may be increased from a minimum discharge capacity (for that compressor) to a predetermined discharge capacity, and refrigerant gas may begin circulating in a refrigerant circuit. The lubricant oil discharged into the refrigerant circuit may return to a crank chamber of the variable displacement compressor. Therefore, the lubricant oil in the crank chamber may be stirred to at least a minimum required degree by a swash plate; and sealing members for the drive shaft, sliding members, and coupling members of the variable displacement compressor also may be lubricated at least to a minimum required degree. The remaining structure and operation of the capacity control device of this embodiment are substantially the same as the capacity control device of the first embodiment of the present invention. During the high engine rev count, e.g., more than 5,000 engine rev counts (RPMs), if the discharge capacity of the variable displacement compressor is increased above a minimum discharge capacity, friction between parts of the variable displacement compressor may rapidly increase. As a result, the variable displacement compressor may be damaged. Therefore, if the rev count of the engine of the vehicle exceeds a predetermined value, it is preferable to maintain the minimum discharge capacity operation of the variable displacement compressor.

In the present invention, the combination of features and elements of the second embodiment and the fifth embodiment is a first alternative to the present invention. In the first alternative to the present invention, if the elapsed time of the minimum discharge capacity operation exceeds the predetermined time, and if the rev count of the engine of the vehicle falls below the predetermined value, and if the outside temperature exceeds the predetermined temperature, and if the impressed voltage of the evaporator fan exceeds the predetermined voltage, the discharge capacity of the variable displacement compressor may be increased from a minimum discharge capacity to a predetermined discharge capacity. Moreover, the combination of features and elements of the third embodiment and the fifth embodiment is a second alternative to the present invention. In the second alternative to the present invention, if the elapsed time of the minimum discharge capacity operation exceeds the predetermined time, and if the rev count of the engine of the vehicle falls below the predetermined value, and if the refrigerant pressure of the automotive air conditioning system exceeds the predetermined value, and if the impressed voltage of the evaporator fan exceeds the predetermined voltage, the discharge capacity of the variable displacement compressor may be increased from a minimum discharge capacity to a predetermined discharge capacity. Moreover, the combination of features and elements of the fourth embodiment and the fifth embodiment is a third alternative to the present invention. In the third alternative to the present invention, if the elapsed time of the minimum discharge operation exceeds the predetermined time, and if the rev count of the engine of vehicle falls below the predetermined value, and if the refrigerant temperature of the automotive air conditioning system exceeds the predetermined temperature, and if the impressed voltage of the evaporator fan exceeds the predetermined voltage, the discharge capacity of the variable displacement compressor may be increased from a minimum discharge capacity to a predetermined discharge capacity.

In the above-described embodiments, the present invention is applied to the capacity control device of the clutchless, variable displacement compressor. However, the present invention also may be applied to a capacity control device of a variable displacement compressor, which is connected to an engine of a vehicle via a clutch, e.g., an electromagnetic clutch. This displacement control device controls maintain a minimum discharge capacity operation for the variable displacement compressor. As a result, the parts in the variable displacement compressor also may be lubricated, and scoring or cracking the variable displacement compressor may be reduced or eliminated.

As described above, with respect to embodiments of the present invention of a displacement control device of a clutchless, variable displacement compressor, if an elapsed time of a minimum discharge operation exceeds a predetermined time, a discharge capacity of the variable displacement compressor may be increased from a minimum discharge capacity (for that compressor) to a predetermined discharge capacity. Thereafter, refrigerant gas may begin circulating in a refrigerant circuit, and a lubricant oil discharged into the refrigerant circuit may return to a crank chamber of the variable displacement compressor. Therefore, the lubricant oil in the crank chamber may be stirred to at least a minimum required degree by a swash plate; and sealing members for the drive shaft, sliding members, and coupling members of the variable displacement compressor may be lubricated at least to a minimum required degree. As a result, scoring or cracking of the variable displacement compressor may be effectively reduced or eliminated. Moreover, if an impressed voltage of an evaporator fan is greater than the predetermined value, in other words, only if the evaporator fan is operated, the discharge capacity of the variable displacement compressor may be increased from the minimum discharge capacity to a predetermined discharge capacity, and the possibility of damage to the variable displacement compressor by a back flow of liquefied refrigerant gas may be reduced or eliminated.

Although the present invention has been described in connection with preferred embodiments, the invention is not limited thereto. It will be understood by those skilled in the art that variations and modifications may be made within the scope and spirit of this invention, as defined by the following claims.

What is claimed is:

1. A device for controlling a discharge capacity of a variable displacement compressor for use in an automotive air conditioning system of a vehicle, said air conditioning system having an evaporator fan, said device comprising:
   a control means for adjusting said discharge capacity of said compressor between a minimum discharge capacity and a maximum discharge capacity;
   a first detector means for detecting an elapsed time of a minimum discharge capacity operation of said compressor; and
   a second detector means for detecting an impressed voltage of said evaporator fan of said air conditioning system,
   wherein said discharge capacity increases from said minimum discharge capacity to a predetermined discharge capacity when said elapsed time of said minimum discharge capacity operation is greater than a predetermined time and when said impressed voltage of said evaporator fan is greater than a predetermined voltage.

2. The device for claim 1, further comprising:
   a third detector means for detecting a temperature outside of said vehicle,
   wherein said discharge capacity increases from said minimum discharge capacity to a predetermined discharge capacity when said elapsed time of said minimum discharge capacity operation is greater than a predetermined time and when said temperature is greater than a predetermined temperature and when said impressed voltage of said evaporator fan is greater than a predetermined voltage.

3. The device for claim 1, further comprising:
   a third detector means for detecting a refrigerant pressure in said air conditioning system,
   wherein said discharge capacity increases from said minimum discharge capacity to a predetermined discharge capacity when said elapsed time of said minimum discharge capacity operation is greater than a predetermined time and when said refrigerant pressure is greater than a predetermined pressure and when said impressed voltage of said evaporator fan is greater than a predetermined voltage.

4. The device for claim 1, further comprising:
   a third detector means for detecting a refrigerant temperature in said air conditioning system,
   wherein said discharge capacity increases from said minimum discharge capacity to a predetermined discharge capacity when said elapsed time of said minimum discharge capacity operation is greater than a predetermined time and when said refrigerant temperature is greater than a predetermined temperature and when said impressed voltage of said evaporator fan is greater than a predetermined voltage.

5. The device for claim 1, further comprising:
   a third detector means for detecting a rev count of an engine of said vehicle,
   wherein said discharge capacity increases from said minimum discharge capacity to a predetermined discharge capacity when said elapsed time of said minimum discharge capacity operation is greater than a predetermined time and when said rev count is less than a predetermined value and when said impressed voltage of said evaporator fan is greater than a predetermined voltage.

6. The device for claim 1, further comprising:
   a third detector means for detecting a rev count of an engine of said vehicle; and
   a fourth detector means for detecting a temperature outside of said vehicle,
   wherein said discharge capacity increases from said minimum discharge capacity to a predetermined discharge capacity when said elapsed time of said minimum discharge capacity operation is greater than a predetermined time and when said temperature is greater than a predetermined temperature and when said rev count is less than a predetermined value and when said impressed voltage of said evaporator fan is greater than a predetermined voltage.

7. The device for claim 1, further comprising:

a third detector means for detecting a rev count of an engine of said vehicle; and a fourth detector means for detecting a refrigerant pressure in said air conditioning system, wherein said discharge capacity increases from said minimum discharge capacity to a predetermined discharge capacity when said elapsed time of said minimum discharge capacity operation is greater than a predetermined time and when said refrigerant pressure is greater than a predetermined pressure and when said rev count is less than a predetermined value and when said impressed voltage of said evaporator fan is greater than a predetermined voltage.

8. The device for claim 1, further comprising:

a third detector means for detecting a rev count of an engine of said vehicle; and a fourth detector means for detecting a refrigerant temperature in said air conditioning system, wherein said discharge capacity increases from said minimum discharge capacity to a predetermined discharge capacity when said elapsed time of said minimum discharge capacity operation is greater thaw a predetermined time and when said rev count is less than a predetermined value and when said refrigerant temperature is greater than a predetermined temperature and when said impressed voltage of said evaporator fan is greater than a predetermined voltage.

9. The device of claim 1, wherein said discharge capacity increases from said minimum discharge capacity to a predetermined discharge capacity when a total time of said elapsed time reaches a predetermined time, when said minimum discharge capacity operation is intermittent.

10. The device of claim 2, wherein said discharge capacity increases from said minimum discharge capacity to a predetermined discharge capacity when a total time of said elapsed time reaches a predetermined time, when said minimum discharge capacity operation is intermittent.

11. The device of claim 3, wherein said discharge capacity increases from said minimum discharge capacity to a predetermined discharge capacity when a total time of said elapsed time reaches a predetermined time, when said minimum discharge capacity operation is intermittent.

12. The device of claim 4, wherein said discharge capacity increases from said minimum discharge capacity to a predetermined discharge capacity when a total time of said elapsed time reaches a predetermined time, when said minimum discharge capacity operation is intermittent.

13. The device of claim 5, wherein said discharge capacity increases from said minimum discharge capacity to a predetermined discharge capacity when a total time of said elapsed time reaches a predetermined time, when said minimum discharge capacity operation is intermittent.

14. The device of claim 6, wherein said discharge capacity increases from said minimum discharge capacity to a predetermined discharge capacity when a total time of said elapsed time reaches a predetermined time, when said minimum discharge capacity operation is intermittent.

15. The device of claim 7, wherein said discharge capacity increases from said minimum discharge capacity w a predetermined discharge capacity when a total time of said elapsed time reaches a predetermined time, when said minimum discharge capacity operation is intermittent.

16. The device of claim 8, wherein said discharge capacity increases from said minimum discharge capacity to a predetermined discharge capacity when a total time of said elapsed time reaches a predetermined time, when said minimum discharge capacity operation is intermittent.

17. A method for controlling a discharge capacity of a variable displacement compressor for use in an automotive air conditioning system of a vehicle, said air conditioning system having an evaporator fan, said method comprising the steps of:

decreasing said discharge capacity of said compressor from a maximum discharge capacity to a minimum discharge capacity;

detecting an elapsed time of a minimum discharge capacity operation of said compressor;

detecting an impressed voltage of said evaporator fan of said air conditioning system; and adjusting said discharge capacity from said minimum discharge capacity in response to a comparison between the detected values and predetermined values corresponding to the detected values.

18. The method of claim 17, wherein said step of adjusting said discharge capacity comprises:

increasing said discharge capacity from said minimum discharge capacity to a predetermined discharge capacity when said elapsed time of said minimum discharge capacity operation is greater than a predetermined time and when said impressed voltage of said evaporator fan is greater than a predetermined voltage.

19. The method of claim 17, further comprising the step of:

detecting a temperature outside of said vehicle, wherein said step of adjusting said discharge capacity comprises increasing said discharge capacity from said minimum discharge capacity to a predetermined discharge capacity when said elapsed time of said minimum discharge capacity operation is greater than a predetermined time and when said temperature is greater than a predetermined temperature and when said impressed voltage of said evaporator fan is greater than a predetermined voltage.

20. The method of claim 17, further comprising the step of:

detecting a refrigerant pressure in said air conditioning system, wherein said step of adjusting said discharge capacity comprises increasing said discharge capacity from said minimum discharge capacity to a predetermined discharge capacity when said elapsed time of said minimum discharge capacity operation is greater than a predetermined time and when said refrigerant pressure is greater than a predetermined pressure and when said impressed voltage of said evaporator fan is greater than a predetermined voltage.

21. The method of claim 17, further comprising the step of:

detecting a refrigerant temperature in said air conditioning system, wherein said step of adjusting said discharge capacity comprises increasing said discharge capacity from said minimum discharge capacity to a predetermined discharge capacity when said elapsed time of said minimum discharge capacity operation is greater than a predetermined time and when said refrigerant temperature is greater than a predetermined temperature and when said impressed voltage of said evaporator fan is greater than a predetermined voltage.

22. The method of claim 17, further comprising the step of:

detecting a rev count of an engine of said vehicle, wherein said step of adjusting said discharge capacity comprises increasing said discharge capacity from said minimum discharge capacity to a predetermined discharge capacity when said elapsed time of said minimum discharge capacity operation is greater than a predetermined time and when said rev count is less than a predetermined value and when said impressed voltage of said evaporator fan is greater than a predetermined voltage.

23. The method of claim 17, further comprising the steps of:

detecting a rev count of an engine of said vehicle; and detecting a temperature outside of said vehicle, wherein said step of adjusting said discharge capacity comprises increasing said discharge capacity from said minimum discharge capacity to a predetermined discharge capacity when said elapsed time of said minimum discharge capacity operation is greater than a predetermined time and when said temperature is greater than a predetermined temperature and when said rev count is less than a predetermined value and when said impressed voltage of said evaporator fan is greater than a predetermined voltage.

24. The method of claim 17, further comprising the steps of:

detecting a rev count of an engine of said vehicle; and detecting a refrigerant pressure in said air conditioning system, wherein said step of adjusting said discharge capacity comprises increasing said discharge capacity from said minimum discharge capacity to a predetermined discharge capacity when said elapsed time of said minimum discharge capacity operation is greater than a predetermined time and when said refrigerant pressure is greater than a predetermined pressure and when said rev count is less than a predetermined value and when said impressed voltage of said evaporator fan is greater than a predetermined voltage.

25. The method of claim 17, further comprising the steps of:

detecting a rev count of an engine of said vehicle; and detecting a refrigerant temperature in said air conditioning system, wherein said step of adjusting said discharge capacity comprises increasing said discharge capacity from said minimum discharge capacity to a predetermined discharge capacity when said elapsed time of said minimum discharge capacity operation is greater than a predetermined time and when said rev count is less than a predetermined value and when said refrigerant temperature is greater than a predetermined temperature and when said impressed voltage of said evaporator fan is greater than a predetermined voltage.

26. The method of claim 17, wherein said step of adjusting is provided when a total time of said elapsed time equals a predetermined time, when said minimum discharge capacity operation is intermittent.

27. The method of claim 18, wherein said step of adjusting is provided when a total time of said elapsed time equals a predetermined time, when said minimum discharge capacity operation is intermittent.

28. The method of claim 19, wherein said step of adjusting is provided when a total time of said elapsed time equals a predetermined time, when said minimum discharge capacity operation is intermittent.

29. The method of claim 20, wherein said step of adjusting is provided when a total time of said elapsed time equals a predetermined time, when said minimum discharge capacity operation is intermittent.

30. The method of claim 21, wherein said step of adjusting is provided when a total time of said elapsed time equals a predetermined time, when said minimum discharge capacity operation is intermittent.

31. The method of claim 22, wherein said step of adjusting is provided when a total time of said elapsed time equals a predetermined time, when said minimum discharge capacity operation is intermittent.

32. The method of claim 23, wherein said step of adjusting is provided when a total time of said elapsed time equals a predetermined time, when said minimum discharge capacity operation is intermittent.

33. The method of claim 24, wherein said step of adjusting is provided when a total time of said elapsed time equals a predetermined time, when said minimum discharge capacity operation is intermittent.

34. The method of claim 25, wherein said step of adjusting is provided when a total time of said elapsed time equals a predetermined time, when said minimum discharge capacity operation is intermittent.

* * * * *